Patented Dec. 7, 1926.

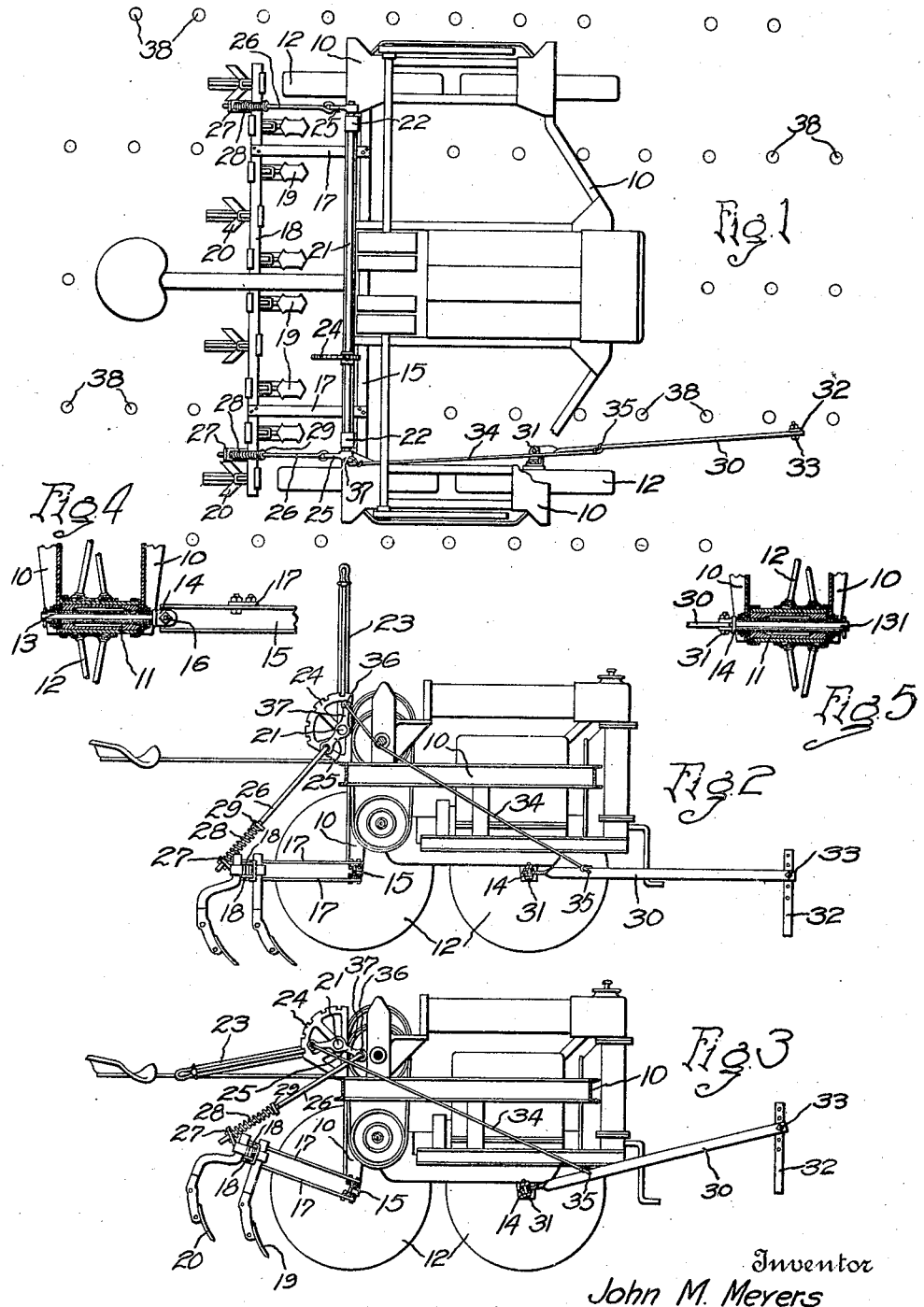

1,609,734

UNITED STATES PATENT OFFICE.

JOHN M. MEYERS, OF PITTSBURGH, PENNSYLVANIA, ASSIGNOR TO GENERAL MOTORS CORPORATION, OF DETROIT, MICHIGAN, A CORPORATION OF DELAWARE.

CULTIVATOR ATTACHMENT FOR FARM TRACTORS.

Application filed January 31, 1921. Serial No. 441,300.

My invention relates to agricultural implements, and particularly to cultivator mechanism designed to be used in connection with and to constitute an attachment to a motor driven tractor designed for general farm purposes; the attachment in question being readily detachable from the tractor when the same is not to be used for cultivating so that the tractor can then be used with other attachments, or for general hauling purposes.

The principal object of my invention is to provide an improved cultivator attachment for tractors, the same having a guide associated with the cultivator mechanism and extending in front of the tractor and designed to move along a row of plants when the tractor is in use; the mechanism in question being so constructed and arranged that the cultivator shovels and the guide are lifted simultaneously to permit the maneuvering of the tractor at the ends of the rows, or in turning corners.

A further object of my invention is to provide an improved cultivator attachment for tractors having a guide adapted to move along a row of plants when the tractor is in use, to thereby indicate to the operator of the machine the position of the cultivator shovels with reference to the rows so as to prevent the plants from being injured by the shovels.

A further object of my invention is to provide an improved cultivator attachment for use with tractors of the general type and class above referred to and wherein both the cultivator shovels and the guide are adjustable so as to adapt the machine as a whole to the cultivation of rows of different spacing, thus providing a machine which may be used to cultivate rows of plants spaced different distances apart.

With the above and other objects of invention in view my invention consists in the improved cultivator attachment and subordinate parts and auxiliary features thereof illustrated in the accompanying drawing and hereinafter described and claimed; and in such variations and modifications thereof, within the scope of the concluding claims, as will be obvious to those skilled in the art to which my invention relates.

Referring now to the drawing wherein the preferred embodiment of my invention is illustrated:

Figure 1 is a plan view showing a tractor designed for general farm purposes and of a form available in the market, the same being equipped with a cultivator attachment made in accordance with my invention.

Figure 2 is a view showing a section of the tractor and cultivator attachment shown in Figure 1 upon a vertical plane located just beyond the near wheels of the tractor, the guide and cultivator shovels being in their lowermost positions.

Figure 3 is a view similar to Figure 2 but showing the guide and cultivator shovels raised from the ground.

Figure 4 is a fragmentary view upon a larger scale showing the manner of connecting the cultivator attachment to the tractor frame.

Figure 5 is a view likewise upon an enlarged scale showing the method of connecting the guide member of the device with the tractor frame.

In the drawing, the reference numeral 10 designates the frame of a tractor of a form at present in use and which is designed for general agricultural purposes; the said frame having depending leg portions at each of its four corners and between the lower ends of which leg portions hollow shafts or axles 11 extend, which axles serve as supports for the driving wheels 12 of the tractor and upon which axles the said wheels are rotatable.

Supported within the hollow shafts 11 of the two rearmost pairs of wheel supporting shafts are pins 13, said pins being rotatable within the shafts and preferably extending entirely therethrough, as shown at Figure 4, so that they may be readily held in place within the axles by transversely extending keys at their outer ends. These pins are provided with slotted heads 14 at their inner ends; and the reference numeral 15 designates a draw bar extending between and the ends of which lie within the slotted heads of the pins and are secured thereto by means of bolts 16, as best shown in Figure 4; from which it follows that the draw bar extends between the lower ends of oppositely disposed pairs of legs and is capable of oscillatory movement about its axis which axis, as will be appreciated, extends along the pins 13 and through the hollow shafts or axles 11 which support the rearmost pair of driving wheels 12.

The reference numerals 17 designate connecting members which may be of various forms but which are shown as flat bars the forward ends of which are fixedly secured to the draw bar 15, and the rear ends of which are connected with the shovel supporting bar of the cultivator attachment; which bar is therefore spaced apart from and in the embodiment of my invention illustrated extends parallel with the draw-bar above referred to. The shovel bar is shown as made up of two separate flat bars 18 arranged alongside one another, altho the particular manner in which the shovel bar is formed is a matter of secondary importance, and the reference numerals 19, 20 designate a plurality of shovels of forms appropriate to the work to be done and which are carried by the shovel supporting bar, and are secured to said bar in such a manner that they may be readily adjusted along the same to thereby vary the position of the shovels and the distance apart of the separate shovels of the attachment.

It will be appreciated that a greater or less number of shovels than the number illustrated may be carried by the shovel supporting bar, and that the positions of the shovels will be so arranged as to properly cultivate the rows of plants indicated by the reference numerals 38.

Means are provided for lifting the shovel carrying bar so that the shovels may be made to clear the ground at the end of the row, or upon turning a corner, as indicated in Figure 3. In the form of my invention illustrated the lifting means comprising an oscillating shaft 21 supported in brackets 22 carried by the frame 10 of the machine and which shaft is operated by a hand lever 23 having a pawl or latch which co-operates with a notched quadrant 24 to hold the lever in various positions. The ends of this shaft 21 are provided with arms 25 which are secured thereto, so as to move therewith, and suitable lifting rods 26 are provided the upper ends of which are hooked into holes provided in the said arms while the lower ends of said rods extend through holes in brackets 27 carried by the shovel bar 18. Surrounding each of the lifting rods 26 is a spring 28 the lower ends of which abut against the brackets 27 above referred to, and the upper ends of which abut against stops 29 upon the lifting rods. These springs, as will be appreciated, provide yieldable means for holding the shovel bar and the shovels carried thereby in their lowermost position, while at the same time they permit the shovel bar and shovels to rise should an obstruction be encountered, during which movement the springs 28 will be compressed without, however, transmitting motion to the lifting rods 26 or subjecting the lifting means of the cultivator attachment to undue strain.

The reference numeral 30 designates a vertically swinging guide bar which is carried by the frame 10 of the tractor and is pivotally connected therewith in such a manner as to swing in a vertical plane, preferably by securing its pivotal end to an oscillating pin 131 in all respects like the pin 13; and which pin 131 extends through the hollow shaft whereupon the right hand one of the forward wheels 12 of the tractor are supported as clearly shown in Figures 1 and 5, the guide bar being shown as secured to its supporting pin by a bolt 31; from which it follows that the forward end of the said bar may be adjusted sidewise and then held in a fixed angular position by means of the bolt 31 while at the same time the bar is movable vertically in whatever position it may be adjusted into, thereby permitting the said bar to be positioned so as to adapt the cultivator attachment for use with rows of plants spaced differently apart relative to one another; the shovels carried by the shovel bar being as a matter of course adjusted to accommodate the attchment to the particular spacing of the rows in each particular case.

The guide bar 30 preferably extends in front of the tractor and the same is shown as provided with a guide member 32 at its free end in the form of depending bar which is pivotally connected with the guide bar by means of a bolt 33 extending through one of a plurality of holes in said member and a hole at the extremity of the guide bar; altho it will be appreciated that other forms of guide member may be provided at the forward end of said guide bar, so long as the member in question is one that can be readily seen by the operator and which may be caused to travel along the rows of plants being cultivated.

Means are provided whereby the guide bar 30 may be lifted so as to move its forward end free from the rows of plants simultaneously with the lifting of the shovel bar and shovels carried thereby, as shown in Figure 3, the means illustrated comprising a flexible member 34 such as a wire or rope the forward end of which extends to and through a hole in the guide bar, as indicated at 35, and the rear end of which extends through and is secured within a hole 36 provided in an arm 37 which is carried by the shaft 21 and is shown as formed integrally with the right hand arm 25 carried by the said operating shaft. It therefore follows that the swinging of the manually operable lever 23 into the position in which it is shown in Figure 3 will result in the lifting of the shovel bar and the shovels carried thereby free from the ground, and in the simultaneous lifting of the forward end of the guide bar and the guide member carried thereby up and away from the rows of plants along which the guide bar moves, thus permitting the tractor to be turned at the ends of the rows without injury to the plants either by the shovels or by the guide member.

It will be appreciated that the entire cultivator mechanism or attachment above described can be readily detached from the tractor when the same is not to be used, and that the tractor itself may then be used for general hauling purposes, or may have other attachments secured to it; one of the purposes of my invention as above pointed out being to provide a cultivator attachment which may be readily attached to and removed from a form or type of tractor designed for use with various attachments, and for general agricultural or hauling purposes.

It will also be appreciated that the guide bar 30 and guide member 32 thereof indicates to the operator of the tractor whether the cultivator shovels are operating properly relative to the rows of plants, and that the proper relationship of the shovels to the plants will be maintained by so steering the tractor as to cause the guide member 32 to pass along in definite relationship to the rows of plants being cultivated. Furthermore, and as above explained, the entire machine may be adjusted so as to cultivate rows of plants spaced differently from the spacing illustrated by loosening the bolt 31 and swinging the guide bar 30 sidewise, and by properly adjusting the shovels to the new spacing; the shovels and guide bar being simultaneously lifted in all positions and adjustments of the parts as will be appreciated.

Having thus described and explained my invention, I claim and desire to secure by Letters Patent:

1. In a tractor of the class described, a suitable frame having oppositely disposed pairs of depending legs, and two hollow wheel supporting shafts extending one between each of said pairs of legs; two pins rotatable within and extending one through each of said hollow shafts; an oscillating draw bar extending between and the ends of which are secured one to each of said pins; an implement carrying bar spaced apart from and extending parallel with said draw bar; a plurality of connecting members intermediate said draw and implement carrying bars and whereby said bars are connected with one another; a plurality of ground working implements carried by said implement carrying bar; a transversely extending oscillating shaft supported in bearings carried by said frame; a lever operatively connected with said shaft for operating the same; two arms carried by said shaft and located one adjacent each end thereof; lifting means intermediate said arms and said implement carrying bar for lifting the same; an oscillating guide bar pivotally connected with said frame and extending in front thereof, and having a guide member at its free end; and operating means intermediate said oscillating rod and said guide bar and through which said guide bar is lifted simultaneously with said implement carrying bar.

2. In a tractor of the class described, a suitable frame having oppositely disposed pairs of depending legs, and hollow wheel supporting shafts extending one between each of said pairs of legs; two pins extending one through each of said hollow shafts; an oscillating draw bar extending between and the ends of which are secured one to each of said pins; an implement carrying bar spaced apart from and extending parallel with said draw bar; a plurality of connecting members intermediate said draw and implement carrying bars and whereby said bars are connected with one another; a plurality of ground working implements carried by said implement carrying bar; an oscillating guide bar pivotally connected with said frame and having a guide member at its free end; and means operatively connected with said implement carrying bar and with said guide bar for simultaneously lifting said members.

3. In a device of the class described, a suitable frame having oppositely disposed pairs of depending legs, and two hollow wheel supporting shafts extending one between each of said pairs of legs; two rotatable supporting pins extending one into each of said hollow shafts; an oscillating draw bar extending between and the ends of which are secured one to each of said pins; an implement carrying bar spaced apart from and extending parallel with said draw bar; a plurality of connecting members intermediate said draw and implementing carrying bars and whereby said bars are connected with one another; a plurality of ground working implements carried by said implement carrying bar; a transversely extending shaft supported in bearings carried by said frame; a lever carried by said shaft for operating the same; two arms carried by said shaft and located one at each end thereof; lifting rods the upper ends of which are connected with said arms and the lower ends of which are operatively connected with said implement carrying bar; and springs carried by said lifting rods and adapted to permit upward movement of said implement carrying bar independent of said lifting rods.

4. In a device of the class described, a suitable frame having oppositely disposed pairs of depending legs, and two hollow wheel supporting shafts extending one between each of said pairs of legs; two rotatable supporting pins supported one within each of said hollow shafts; an oscillating draw bar extending between and the ends of which are secured one to each of said pins; an implement carrying bar spaced apart from said draw bar; connecting means intermediate said draw and implement carrying bars and whereby said bars are connected with one another; a plurality of ground working implements carried by said implement carrying bar; and means operatively connected with said implement carrying bar for lifting the same.

5. In a tractor of the class described, a suitable frame having oppositely disposed depending leg members, and wheels supported from axles located at the lower ends of said leg members; an oscillating draw bar extending between and the ends of which are secured one to each of said leg members; an implement carrying bar spaced apart from and extending parallel with said draw bar; connecting means intermediate said draw and implement carrying bars and whereby said bars are connected with one another; a plurality of ground working implements carried by said implement carrying bar; means operatively connected with said implement carrying bar for lifting the same; a guide bar pivotally connected with said frame and extending in front thereof, and having a guide member at its free end; and an operating member intermediate said implement carrying bar lifting means and said guide bar whereby said guide bar is lifted simultaneously with said implement carrying bar.

6. In a tractor of the class described, a suitable frame having oppositely disposed depending leg members, and wheels supported from and located at the lower ends of said leg members; an oscillating draw bar extending between and the ends of which are secured one to each of said leg members; an implement carrying bar spaced apart from said draw bar; a plurality of connecting members intermediate said draw and implement carrying bars and whereby said bars are connected with one another; a plurality of ground working implements carried by said implement carrying bar; an oscillating guide bar pivotally connected with said frame and having a guide member at its free end; and means operatively connected with said implement carrying bar and with said guide bar for simultaneously lifting said members.

7. In a tractor of the class described; a suitable frame having oppositely disposed pairs of depending legs, and two hollow wheel supporting shafts extending one between each of said pairs of legs; two pins rotatably supported one within each of said hollow shafts; a vertically swinging implement carrying bar the ends of which are connected with said pins; a plurality of ground working implements carried by said implement carrying bar; an oscillating operating shaft; and means intermediate said shaft and said implement carrying bar for imparting vertical movement to said bar.

8. In a tractor of the class described; a suitable frame having oppositely disposed pairs of depending legs, and two hollow wheel supporting shafts extending one between each of said pairs of legs; two pins rotatably supported one within each of said hollow shafts; a vertically swinging implement carrying bar the ends of which are connected with said pins; a plurality of ground working implements carried by said implement carrying bar; an oscillating operating shaft; means intermediate said shaft and said implement carrying bar for imparting vertical movement to said bar; a vertically swinging guide bar pivotally connected with said frame and having a guide member at its free end; and means intermediate said operating shaft and said guide bar and through which the latter is lifted simultaneously with said implement carrying bar.

9. In a device of the class described, and in combination with a tractor having oppositely disposed driving wheels, two hollow shafts whereby said driving wheels are supported, a ground working implement, and two draft devices extending one through each of said hollow axles and whereby said ground working implement is connected with the tractor so as to be drawn thereby.

10. In combination in a tractor, a suitable frame, two pairs of supporting members depending from said frame, two driving wheels supported one between each pair of supporting members by axles the ends of which are supported by said supporting members, and draft mechanism connected with said axles and through which tractive force may be communicated to a device to be drawn.

11. In combination in a tractor, a suitable frame, two supporting devices located at each side of said frame and depending therefrom, two wheels supported one by each of said supporting devices, two hollow axles supported one by each of said supporting devices and whereby said wheels are supported, and a draft device having portions extending through said hollow axles and whereby tractive force may be communicated to a device to be drawn.

In testimony whereof I affix my signature.

JOHN M. MEYERS.